March 1, 1938.  C. A. ZWEIBEL  2,109,715
RAILWAY CAR TRUCK
Filed April 29, 1937  3 Sheets-Sheet 1

Inventor:
Charles A. Zweibel,
By

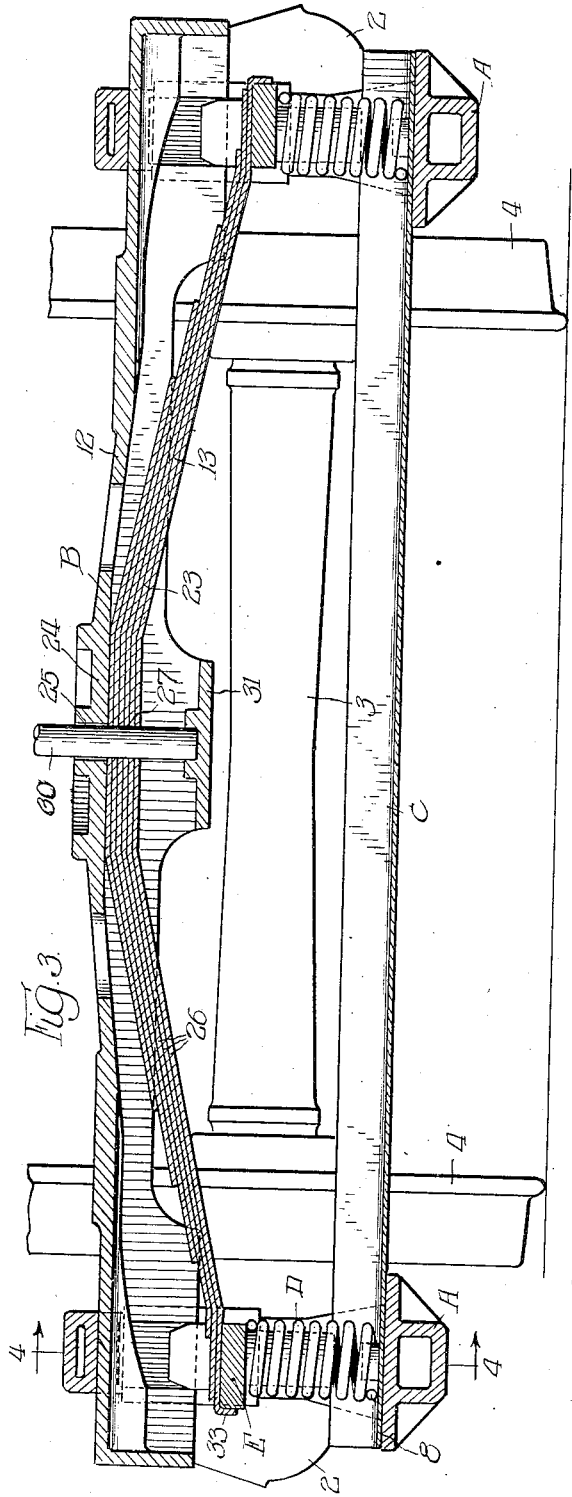

March 1, 1938. C. A. ZWEIBEL 2,109,715
RAILWAY CAR TRUCK
Filed April 29, 1937 3 Sheets-Sheet 3
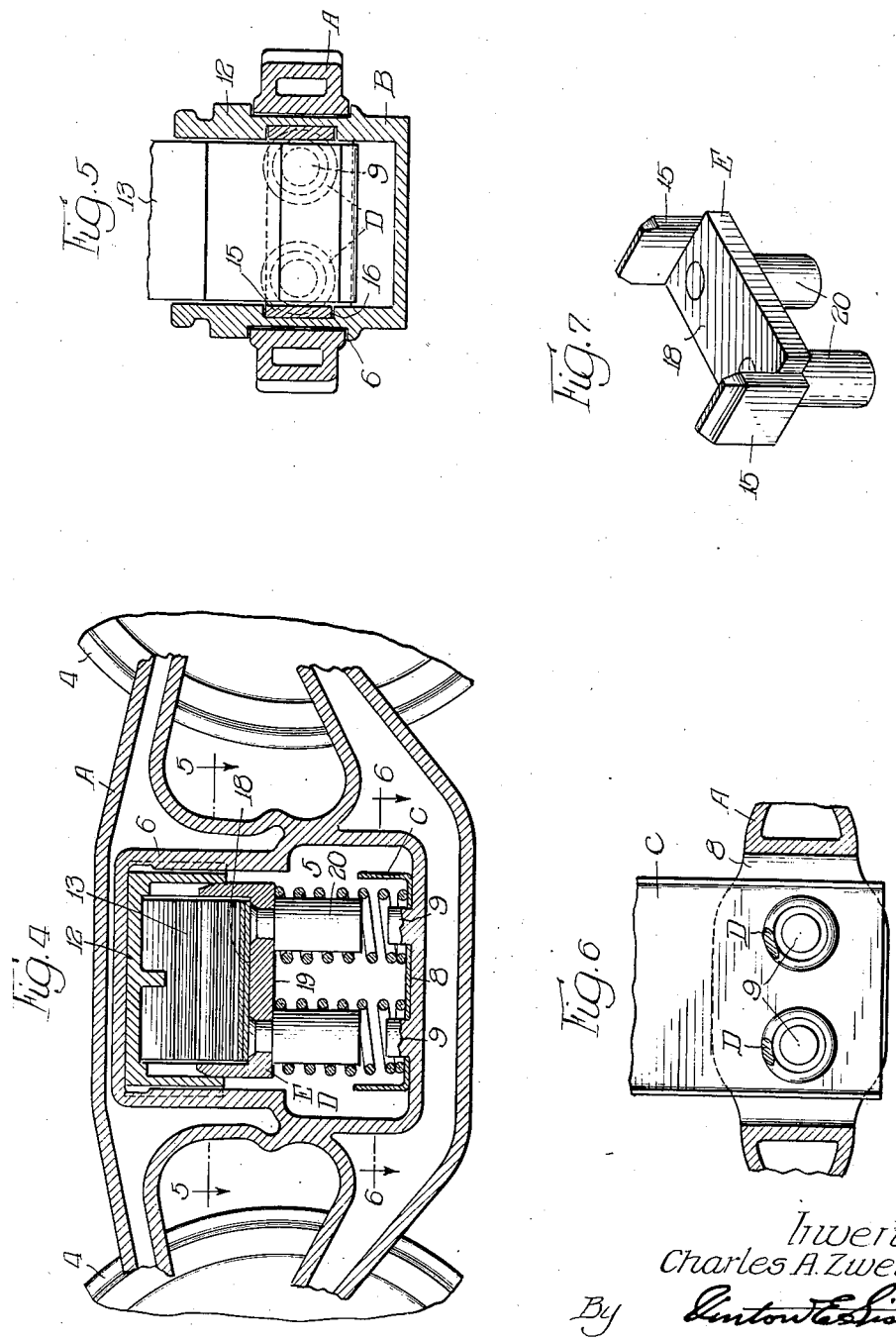
Inventor:
Charles A. Zweibel,
By Patented Mar. 1, 1938

2,109,715

UNITED STATES PATENT OFFICE 2,109,715

RAILWAY CAR TRUCK

Charles A. Zweibel, Louisville, Ky.

Application April 29, 1937, Serial No. 139,634

10 Claims. (Cl. 105—197.1)

The invention relates to railway car trucks and one of the objects of the invention is to provide more resiliency or shock absorbing facilities between the car body and the rail than is now customary to reduce the number of broken springs and other parts of the truck, and furthermore to provide a smoother riding car body so that the lading will not be torn away from its mooring.

Another object is to provide a semi-elliptic leaf spring which cooperates with groups of coil springs to obtain the above mentioned resiliency.

A further object is to provide a truck bolster comprising the combination of a rigid element (which transmits horizontal loads from the car body to the truck side frames) and a resilient element (which resiliently transmits vertical loads from the car body to the truck frame), and a further object is to associate and arrange the rigid element and the resilient element so that they transmit such horizontal and vertical loads independently of each other; at least to a predetermined position, whereupon the resilient element is relieved of the vertical load and such load is transmitted to the rigid element.

Another object is to provide yielding means (coil springs) to support the ends of the resilient element upon the truck side frames (to absorb the normal service shocks) and furthermore, to associate and arrange the rigid element, resilient member and the yielding means so that upon a predetermined downward movement of the truck bolster the vertical load is transmitted from the yielding means to the resilient element.

In the drawings:

Fig. 2 shows an elevation of my improved truck.

Fig. 3 is a section on line 3—3 of Fig. 1.

Fig. 4 is a section on line 4—4 of Fig. 1.

Fig. 5 is a section on line 5—5 of Fig. 4.

Fig. 6 is a section on line 6—6 of Fig. 4.

Fig. 7 is a perspective view of an element of my improved truck.

Figure 1:
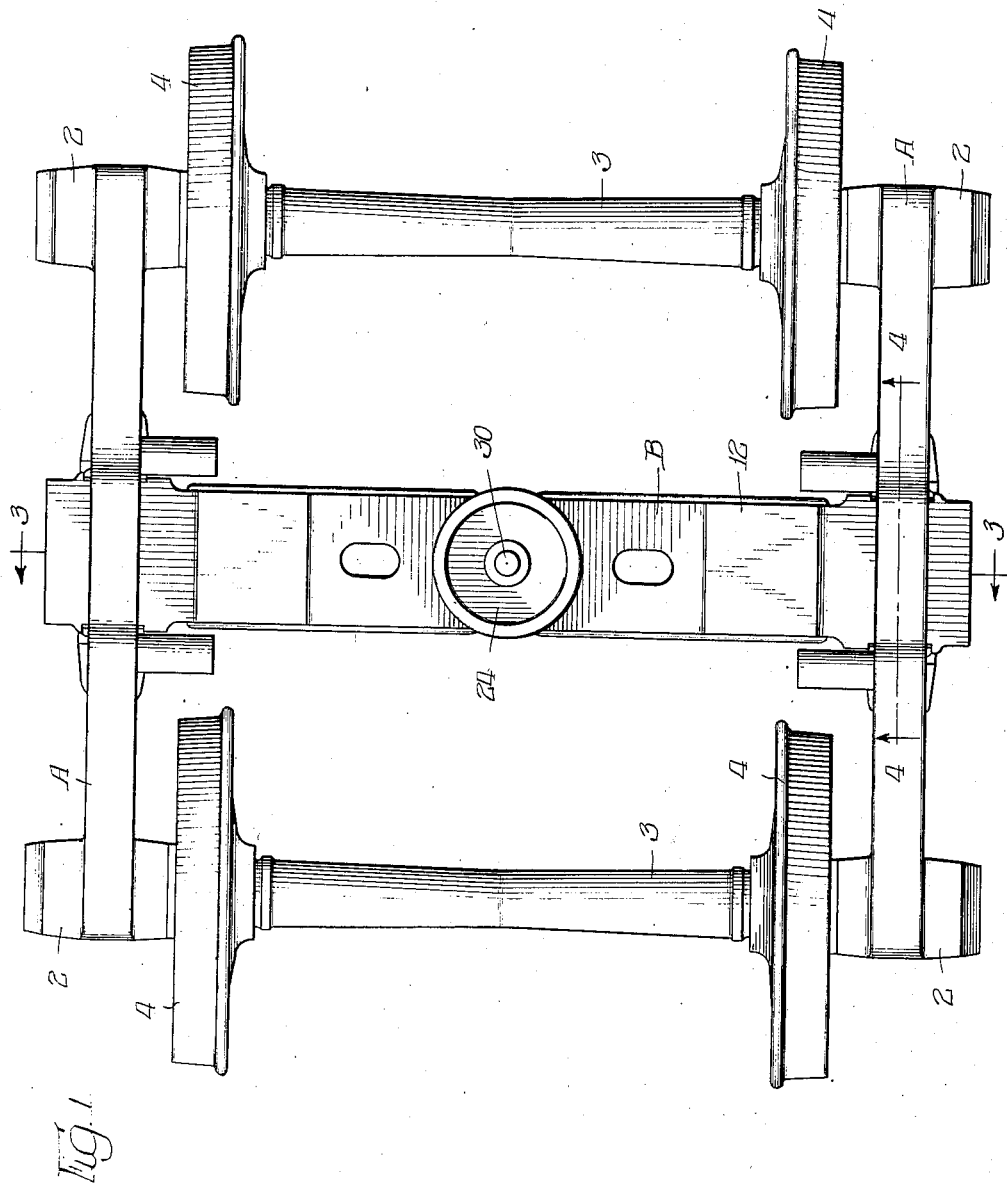
Fig. 1 shows a plan view of my improved truck.

In the form of the invention illustrated the truck comprises spaced apart side frames A provided with journal boxes 2 and the usual brasses and wedges which rest upon the journals of the axles 3 to which the wheels 4 are attached. Each side frame A is provided with the usual bolster opening 5 with an enlarged lower portion for the removal of the bolster B and a narrower upper portion having bolster guides 6. The lower part of the opening forms the spring seat 8 or the spring plank seat 8 if a spring plank C is used. The spring plank C extends between and rests upon the spring plank seats 8 of the opposite frames A and is provided with apertures which register with pintles 9 projecting upwardly from the spring seat 8 of the side frame. These pintles 9 hold the spring plank C in place.

A group of coil springs D rest upon the spring seat 8 (or the spring plank C, if one is used) which springs surround the pintles 9 and are retained in place thereby.

The truck bolster B comprises a rigid element 12 and a resilient element 13. The rigid bolster element 12 is shown of cast metal and is of box section adjacent the middle of the bolster and of inverted channel sections on each side of the box section. The rigid bolster element 12 extends between the side frames A and has a vertically slidable engagement with the bolster guides 6 on both side frames. The channel section is very strong to resist horizontal loads imposed upon the truck bolster D by the shocks of coupling cars and other service shocks, such as the application of brakes.

A member E has a vertically slidable engagement with the rigid bolster element 12 preferably within the inverted channel section. This slidable engagement is obtained by the arms 15 sliding within grooves 16 on the inside of the bolster element 12, which arms 15 extend upwardly to engage the rigid bolster element to restrict the downward movement thereof.

The member E is provided with a spring bearing 18 on its upper surface and a spring seat 19 on its lower surface and also with depending projections 20 which are preferably positioned within the coil springs D to hold them in place and are directly above the pintles 9 on the spring seat 8 of the side frame.

The resilient element 13 of the truck bolster B comprises a semi-elliptical spring 23 which is attached adjacent its medial portion to the rigid bolster element 12, preferably on the underside thereof and within the box section. The upper part 24 of the box section is provided with an aperture 25 and the several leaves 26 of the semi-elliptical spring 23 are also provided with apertures 27 so that the single pin 30 retains its several leaves in proper relation to each other and to the rigid bolster element 12. The lower part 31 of the box section is imperforate so that it supports the pin 30.

The semi-elliptical spring, or resilient bolster element 23, extends between and rests upon the spring bearings 18 of the members E and is preferably provided with depending lips 33 to retain it in place.

The operation of the truck is as follows:

The horizontal thrust imposed on the truck bolster B by the shocks of coupling or application of brakes is transmitted to the side frames A by the rigid bolster element 12 independently of the resilient bolster element 13, that is, independently of the semi-elliptical spring 23.

The vertical load imposed upon the truck bolster B is carried by the resilient truck element 13; that is, by the semi-elliptical spring 23 to the coil springs D so that the semi-elliptical springs 23 and coil springs D cooperate with each other to yieldingly support the load. The semi-elliptical spring 23 is necessarily relatively stiff, therefore, the ordinary shocks of the car in motion are absorbed by the coil springs D, but any heavy load or shock is also partially absorbed by the semi-elliptical spring 23.

The elements are so proportioned that upon a predetermined load the coil springs D are compressed until the projections 20 on the member E engage the pintles 9 on the spring seat 8 and thus entirely relieve the coil springs D of the vertical load, which vertical load is then entirely carried by the semi-elliptical spring 23. Upon a further vertical compression of the semi-elliptical spring 23 the arms 15 of the members E engage the rigid bolster element 12 and relieve the semi-elliptical spring 23 so that the semi-elliptical spring 23 and coil springs D are both relieved of their vertical loads and the vertical load is carried directly by the rigid bolster element 12 to the side frames A.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. A railway car truck bolster comprising a rigid bolster element of box section adjacent the middle thereof and of inverted channel section on each side of the box section, a resilient bolster element comprising a semi-elliptical spring having several leaves, the upper part of said box section and the several leaves of the semi-elliptical spring being provided with registering apertures, and a pin engaging said apertures and resting upon the lower part of said box section whereby the single pin retains said several leaves in proper relation with each other and with the rigid bolster element.

2. A railway car truck comprising spaced apart side frames, a truck bolster, said bolster comprising a rigid element extending between said frames and associated therewith to transmit the horizontal load to said frames and a resilient element extending between said frames and associated therewith to transmit the vertical loads to said frames substantially independently of said rigid element, and a coil spring between each end of the resilient element and the adjacent side frame.

3. A railway car truck comprising spaced apart side frames, each of said frames having bolster guides and a spring seat provided with pintles, a coil spring resting upon each of said spring seats and associated with said pintles to retain the coil springs in place, a rigid bolster element extending between said side frames and having vertically guided engagement with said bolster guides, a member resting upon each coil spring and having vertically guided engagement with the rigid bolster element, each of said members being provided with a spring bearing, and a semi-elliptical spring having its medial portion attached to said rigid bolster element, said semi-elliptical spring extending between and resting upon the spring bearings of said members whereby the vertical load imposed upon the truck is yieldingly transmitted by the semi-elliptical spring to the coil springs.

4. A railway car truck comprising spaced apart side frames, each of said frames having bolster guides and a spring seat provided with pintles, a coil spring resting upon each of said spring seats and associated with said pintles to retain the coil springs in place, a rigid bolster element extending between said side frames and having vertically guided engagement with said bolster guides, a member resting upon each coil spring and having vertically guided engagement with the rigid bolster element, each of said members being provided with a spring bearing and depending projections positioned within the coil springs, and a semi-elliptical spring having its medial portion attached to said rigid bolster element, said semi-elliptical spring extending between and resting upon the spring bearings of said members whereby the vertical load imposed upon the truck is yieldingly transmitted by the sem-elliptical spring to the coil springs, said projections on the members being engageable with said pintles on the side frames upon a predetermined deflection of the coil springs whereby the coil springs function during the ordinary car movements and the semi-elliptical spring functions when heavier shocks and loads are imposed upon the truck.

5. A railway car truck comprising spaced apart side frames, each of said frames having bolster guides and a spring seat provided with pintles, a coil spring resting upon each of said spring seats and associated with said pintles to retain the coil springs in place, a rigid bolster element extending between said side frames and having vertically guided engagement with said bolster guides, a member resting upon each coil spring and provided with a spring bearing, each of said members being provided with upstanding arms having vertically guided engagement with said rigid bolster element, and a semi-elliptical spring having its medial portion attached to said rigid bolster element, said semi-elliptical spring extending between and resting upon the spring bearings of said members whereby the vertical load imposed upon the truck is yieldingly transmitted by the semi-elliptical spring to the coil springs, said upstanding arms on the members being engageable with stops on the rigid bolster element upon a predetermined deflection of the semi-elliptical spring to limit the deflecting movement of the semi-elliptical spring whereby any additional vertical load upon the semi-elliptical spring is taken by the rigid element.

6. A railway car truck comprising spaced apart side frames, each of said frames having bolster guides and a spring seat provided with pintles, a coil spring resting upon each of said spring seats and associated with said pintles to retain the coil springs in place, a rigid bolster element extending between said side frames and having vertically guided engagement with said bolster guides, a member resting upon each coil spring, each of said members being provided with a spring bearing and depending projections positioned within the coil springs, each of said members being also provided with upstanding arms having vertically guided engagement with said rigid bolster element, and a semi-elliptical spring having its medial portion attached to said rigid bolster element, said semi-elliptical spring extending between and resting upon the spring bearings of said members whereby the vertical load imposed upon the truck is yieldingly transmitted by the semi-elliptical spring to the coil springs, said projections on the members being engageable with said pintles on the side frames upon a predetermined deflection of the coil springs whereby the coil springs function during the ordinary car movements and the semi-elliptical spring functions when heavier shocks and loads are imposed upon the truck, said upstanding arms on the members being engageable with stops on the rigid bolster element upon a predetermined deflection of the semi-elliptical spring to limit the deflecting movement of the semi-elliptical spring whereby any additional vertical load upon the semi-elliptical spring is taken by the rigid element.

7. A railway car truck comprising spaced apart side frames, each of said frames having bolster guides and a spring seat, a coil spring resting upon each of said spring seats, a rigid bolster element extending between said side frames and having vertically guided engagement with said bolster guides, and a semi-elliptical spring extending between said side frames and having its medial portion attached to said rigid bolster element and having its opposite end portions supported by said coil springs whereby the vertical load imposed upon the truck is yieldingly transmitted by the semi-elliptical spring to the coil springs.

8. A railway car truck comprising spaced apart side frames, a truck bolster, said bolster comprising a rigid element extending between said frames and associated therewith to transmit the horizontal load to said frames and a resilient element extending between said frames, and vertically yielding means between each end of the resilient element and the adjacent side frame, said yielding means and resilient element constructed and arranged so that the resilient element and the yielding means take a vertical load imposed upon the middle of the truck bolster.

9. A structure as defined in claim 8 wherein a stop is provided to limit the deflection of the yielding means so that any additional vertical load imposed upon the middle of the truck bolster is taken by the resilient element.

10. A structure as defined in claim 8 wherein a stop is provided to limit the deflection of the yielding means so that any additional vertical load imposed upon the middle of the truck bolster is taken by the resilient element and wherein means are provided to limit the vertical movement between the ends of the rigid element and the resilient element so that upon a predetermined deflection of the resilient element any additional vertical load imposed upon the middle of the truck bolster is taken by the rigid element.

CHARLES A. ZWEIBEL.